(12) United States Patent
Kim

(10) Patent No.: US 7,031,734 B2
(45) Date of Patent: Apr. 18, 2006

(54) SYSTEM AND METHOD FOR CONFIRMING SHORT MESSAGE SERVICE (SMS) MESSAGE RECEPTION IN MOBILE COMMUNICATION TERMINAL

(75) Inventor: Jong-Gon Kim, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 10/347,607

(22) Filed: Jan. 22, 2003

(65) Prior Publication Data

US 2003/0162554 A1    Aug. 28, 2003

(30) Foreign Application Priority Data

Feb. 27, 2002    (KR) ...................... 10-2002-0010444

(51) Int. Cl.
*H04B 1/04* (2006.01)
*H04Q 7/20* (2006.01)

(52) U.S. Cl. ................... 455/466; 455/412.2; 455/421; 455/566

(58) Field of Classification Search ................ 455/412, 455/414, 421, 432, 466, 517, 550–551, 566, 455/412.2

See application file for complete search history.

(56) References Cited

U.S. PATENT DOCUMENTS 6,230,019 B1 *   5/2001   Lee ............................ 455/466
6,236,853 B1 *   5/2001   Mee et al. ................ 455/414.1
6,424,841 B1 *   7/2002   Gustafsson .................. 455/466
6,529,737 B1 *   3/2003   Skinner et al. ............. 455/466
2004/0259540 A1 * 12/2004 Banerjee et al. ............ 455/425

\* cited by examiner

*Primary Examiner*—Binh K. Tieu
(74) *Attorney, Agent, or Firm*—Roylance Abrams Berdo & Goodman LLP

(57) ABSTRACT

A system and Method for confirming Short Message Service (SMS) reception in a mobile communication terminal. Specifically, the system and method informs a calling party of a message failure state in the case where a called party is not within a call connection area or the mobile communication terminal of the called party is powered off, thereby enhancing the calling party's convenience. The system and method for confirming a SMS message reception in a first mobile communication terminal adapted to transmit a SMS message to a second mobile communication terminal. The system and method perform the operations of: enabling the first mobile communication terminal to send the SMS message to a base station, and enabling the base station to send a first reception acknowledgement signal to the first mobile communication terminal, enabling the base station to send the SMS message to the second mobile communication terminal, and enabling the second mobile communication terminal to send a second reception acknowledgement signal to the base station, and receiving the second reception acknowledgement signal at the base station, and transmitting a response signal to the first mobile communication terminal indicative of whether the SMS message is received at the second mobile communication terminal.

14 Claims, 6 Drawing Sheets

SYSTEM AND METHOD FOR CONFIRMING SHORT MESSAGE SERVICE (SMS) MESSAGE RECEPTION IN MOBILE COMMUNICATION TERMINAL

PRIORITY

This application claims priority under 35 U.S.C. §119 to an application entitled "METHOD FOR CONFIRMING SHORT MESSAGE SERVICE (SMS) MESSAGE RECEPTION IN MOBILE COMMUNICATION TERMINAL", filed in the Korean Intellectual Property Office on Feb. 27, 2002 and assigned Serial No. 2002-10444, the contents of which are incorporated herein by reference.

BACKGROUND OF THE INVENTION

1. Field of the Invention

The present invention relates to a short message service (SMS) for a mobile communication terminal, and more particularly to a system and method for confirming the reception of a SMS message by a mobile communication terminal. More specifically, the present invention relates to a system and method that enables a calling party to determine whether a SMS message has been received by the mobile communication terminal of the called party.

2. Description of the Related Art:

Typically, as shown in FIGS. 1 and 2, SMS provides for transmitting a message from a SMS service center 106 to a mobile communication terminal 100 via a Mobile Switching Center (MSC) and a base station (BTS) 102 in either a Global System for Mobile Communications (GSM), Code Division Multiple Access (CDMA) or Personal Communications Service (PCS) system. Furthermore, the SMS service provides for accumulating messages received from a fixed network via a processor of a mobile network, converting the accumulated messages into a digital message format, and then transmitting the digital-format messages to the mobile communication terminal 100. FIG. 2 further shows an example of the relationship between the SMS service center 106, an information provider 12, a public switched telephone network (PSTN) 11, and the MSC 104, BTS 102 and mobile terminal 100. The SMS sending function is classified as a general message, a quick message, or an urgent message according to a data transfer rate. If there is an incoming call requiring a change to the SMS sending function including the data transfer rate, a controller 10 (shown in FIG. 3) for the mobile communication terminal 100 controls a display 80 to display different colors based on the type of the SMS sending function. FIG. 3 also illustrates further components of a mobile terminals, such as a controller 10, memory 20, duplexer 30, antenna ANT, receiver 40, transmitter 50, audio unit 60, speaker SP, microphone MIC, ringer, key entry unit 70, display 80 and voice mixer 90. Further details are shown and described in Korean Patent Publication No. 2001-0059496, the entire contents of which being incorporated herein by reference.

However, in the case where a called party is not within a call connection area, or the mobile communication terminal 100 of the called party is powered off, it is impossible to inform the called party of the transmission of SMS messages. In this case, a calling party is not aware of its failure to receive the SMS message. In other words, where there is no response to a SMS message requesting a called party to send an immediate response message, it is impossible for the calling party to determine whether the called party received the SMS message.

SUMMARY OF THE INVENTION

Therefore, it is an object of the present invention to provide a system and method for confirming the reception of a SMS message to enable a mobile communication terminal to send both an urgent SMS message and a general SMS message to allow a calling party to determine whether a called party received the SMS message at a its mobile communication terminal.

It is another object of the present invention to provide a system and method for confirming the reception of a SMS message to inform a calling party of a message delivery failure state when a called party is not within a call connection area or the mobile communication terminal of the called party is powered off.

These and other objects can substantially be accomplished by a system and method for confirming the reception of a Short Message Service (SMS) message in a first mobile communication terminal adapted to transmit a SMS message to a second mobile communication terminal. The system and method employ comprising the operations of: enabling the first mobile communication terminal to send the SMS message to a base station, and enabling the base station to send a first reception acknowledgement signal to the first mobile communication terminal; enabling the base station to send the SMS message to the second mobile communication terminal, and enabling the second mobile communication terminal to send a second reception acknowledgement signal to the base station. The system and method further employ the operation of receiving the second reception acknowledgement signal at the base station, and transmitting a response signal to the first mobile communication terminal indicative of whether the SMS message is received at the second mobile communication terminal to enable the user of the first mobile communication terminal to verify whether the SMS message has been received by the second mobile communication terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
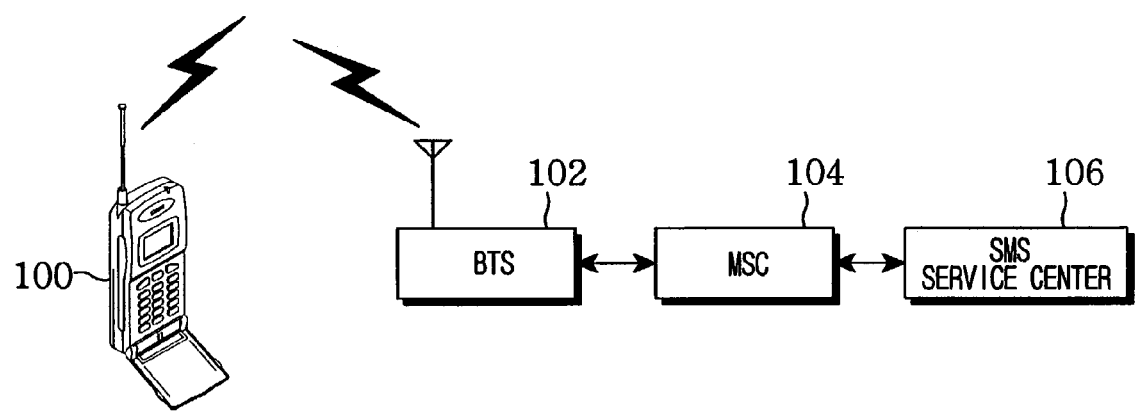
FIGS. 1–2 are views that illustrate an example of a conventional SMS message transmission between a mobile communication terminal and a SMS service center via a base station.
Figure 2:
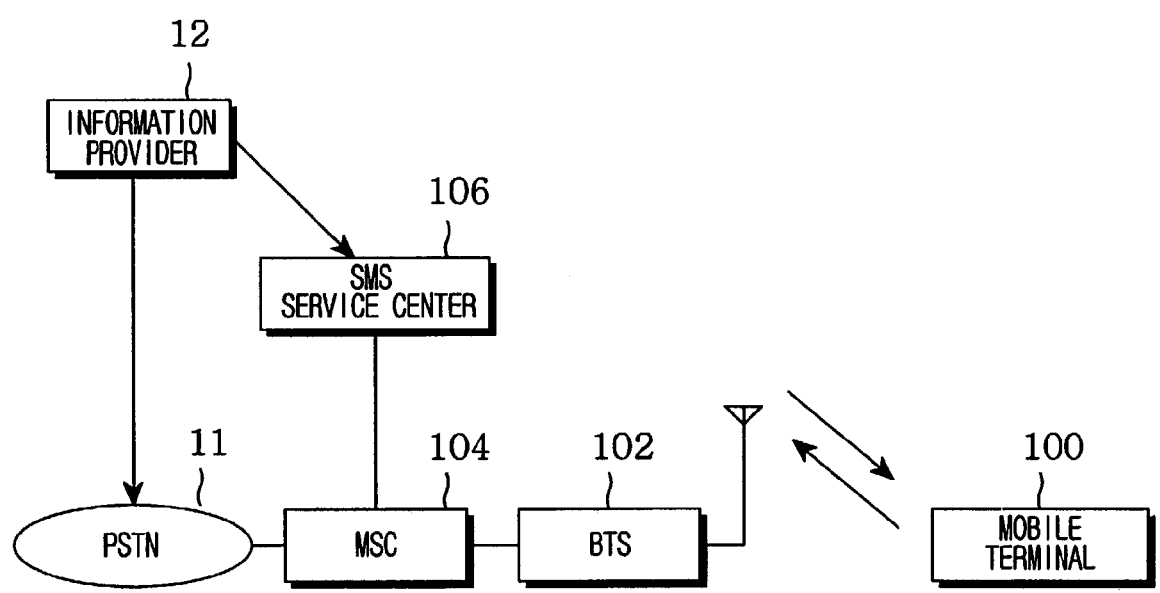
Figure 3:
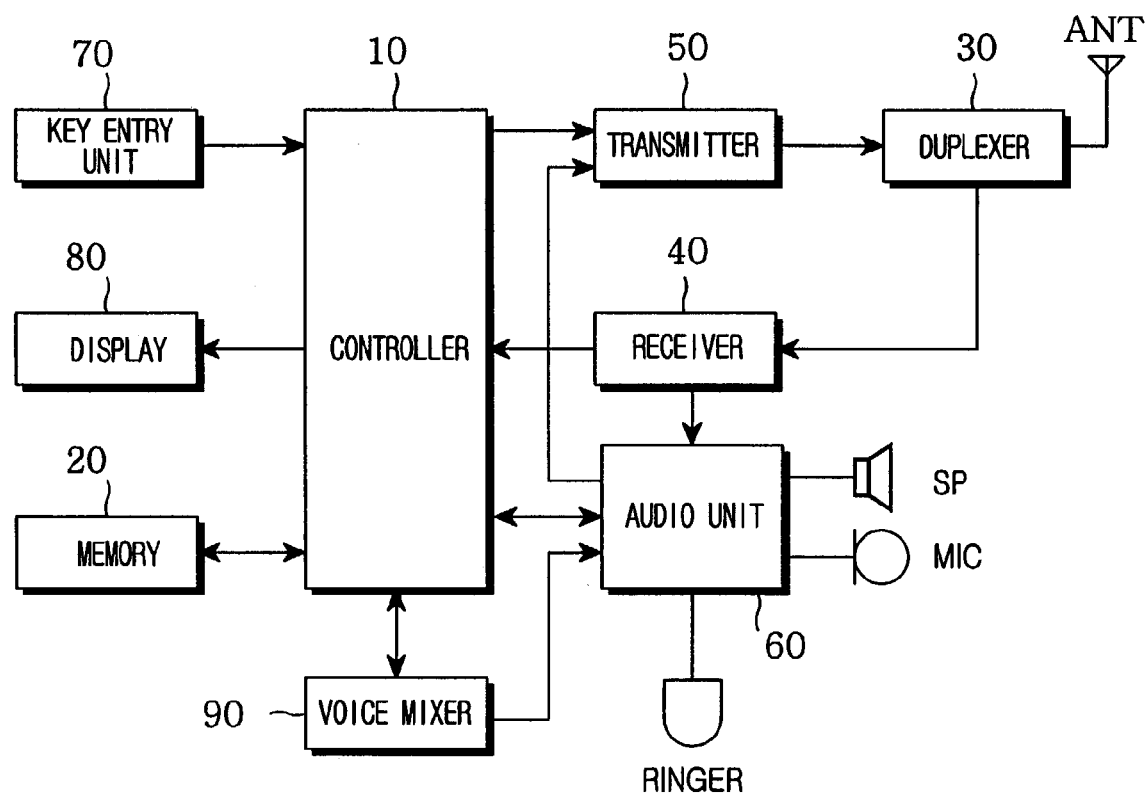
FIG. 3 is a detailed block diagram of a mobile communication terminal shown in FIG. 1.

Several embodiments of the present invention will now be described in detail with reference to the accompanying drawings. In the drawings, the same or similar elements are denoted by the same reference numerals. Also, a detailed description of known functions and configurations have been omitted for conciseness.

Figure 4:
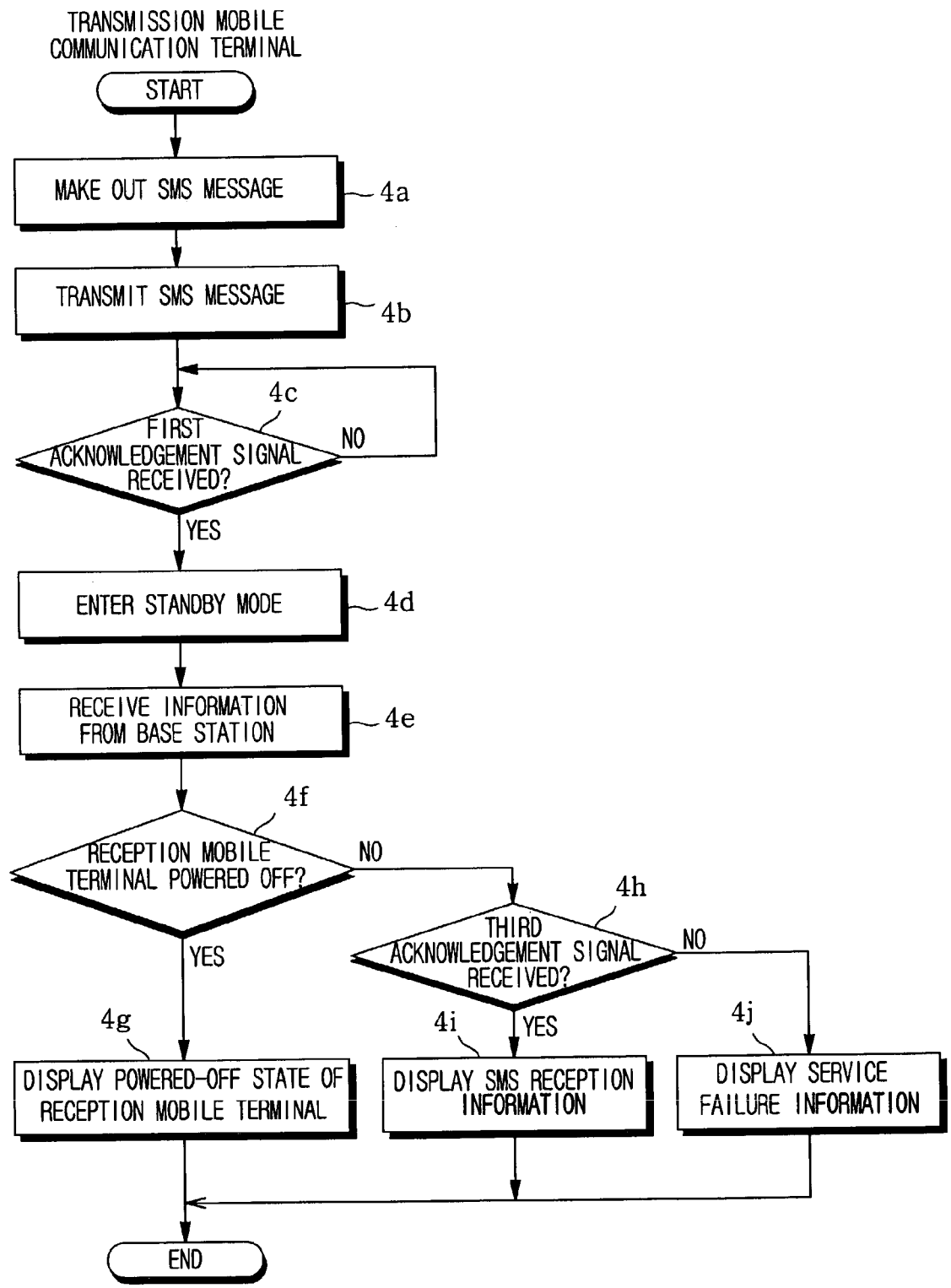
FIG. 4 is a flow chart illustrating an example of operations for transmitting mobile communication terminal to confirm the reception of a SMS message in accordance with an embodiment of the present invention.

FIG. 4 is a flow chart illustrating an example of steps for transmitting mobile communication terminal 100 to confirm the reception of a SMS message in accordance with an embodiment of the present invention. Specifically, in FIG. 4a transmitting mobile communication terminal 100 provides a SMS message to be transmitted in step 4a, transmits the SMS message to a base station 102 in step 4b, and determines whether the SMS message is received at the base station 102 in step 4c. In the case where it is determined in step 4c that the SMS message is received at the base station, a first acknowledgement signal is generated. The transmitting mobile communication terminal 100 enters a standby mode for a prescribed duration of time to receive a confirmation signal from the base station 102 receiving the SMS message in steps 4d and 4e. In this case, if the confirmation signal of the base station 102 is a signal indicating a powered-off state for a receiving mobile communication terminal (not shown) in step 4f the transmitting mobile communication terminal 100 indicates the powered-off state on its display in step 4g. However, if it is determined in step 4f that the receiving mobile communication terminal is not off, and then it is determined that the confirmation signal of the base station 102 is a signal (i.e., a third acknowledgement signal) confirming the reception of the SMS message in step 4h. The transmitting mobile communication terminal 100 then provides a SMS reception confirmation signal on its display in step 4i. Otherwise, in the case where signals other than the signals in steps 4f and 4h are received at the transmitting mobile communication terminal 100, the transmitting mobile communication terminal 100 provides a service failure message on its display in step 4j.

Figure 5:
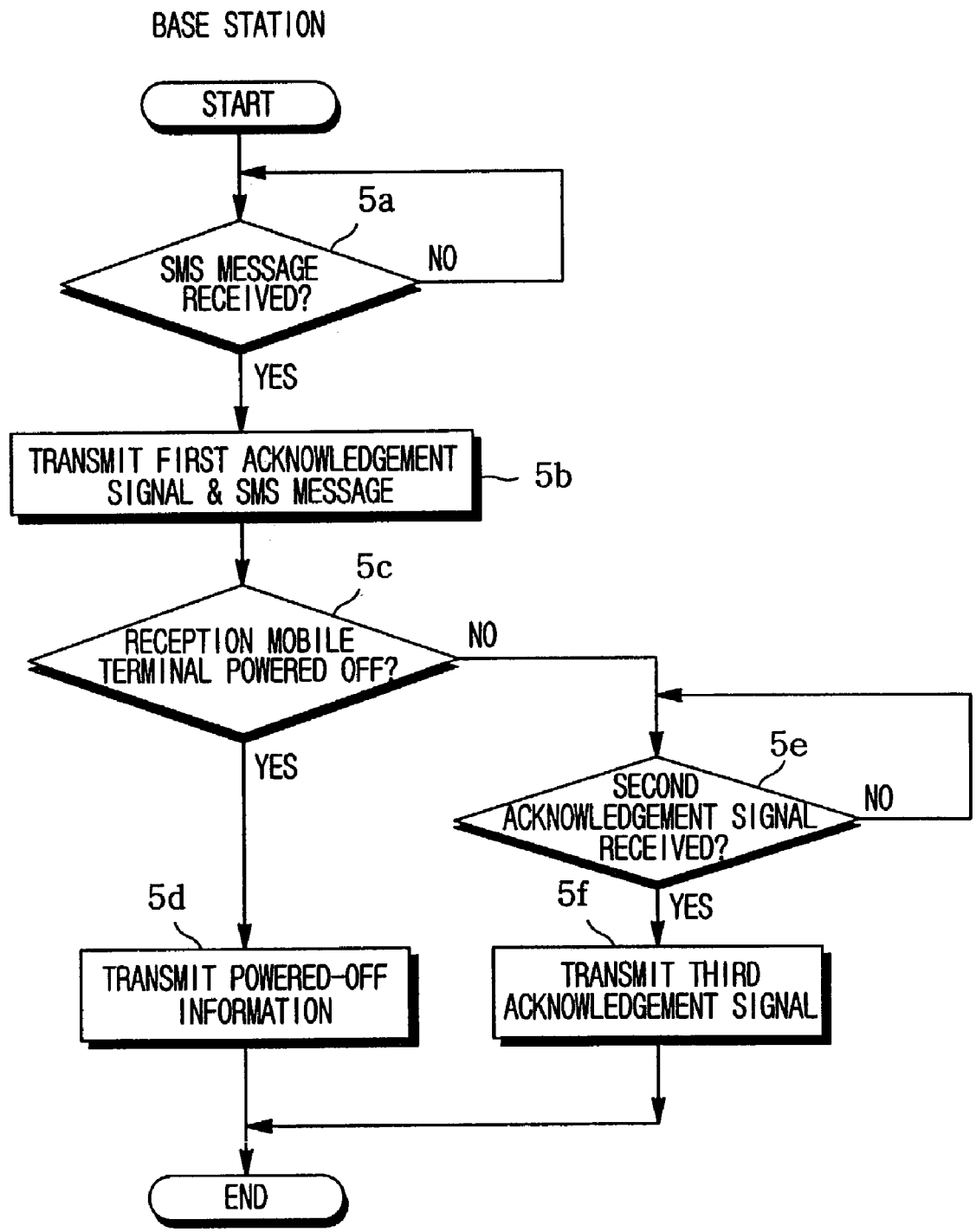
FIG. 5 is a flow chart illustrating an example of operations for a base station to confirm the reception of a SMS message in accordance with an embodiment of the present invention.

FIG. 5 is a flow chart illustrating an example of steps for a base station 102 to confirm the reception of a SMS message in accordance with an embodiment of the present invention.

Referring to FIG. 5, in the case where a base station 102 receives a SMS message originating from a transmitting mobile communication terminal 100 in step 5a, the base station 102 transmits a SMS message reception confirmation signal (i.e., a first acknowledgement signal) to the transmitting mobile communication terminal 100 in step 5b, and transmits the SMS message to the receiving mobile communication terminal in step 5b. The base station 102 determines whether the receiving mobile communication terminal is powered off in step 5c. If it is determined in step 5c that the receiving mobile communication terminal is powered off, then a- signal indicating a powered-off state is transmitted to the transmitting mobile communication terminal 100 in step 5d. Otherwise, if it is determined in step 5c that the receiving mobile communication terminal is not powered off, the base station 102 determines whether the SMS message is received at the receiving mobile communication terminal, and receives a SMS message reception confirmation signal (i.e., a second acknowledgement signal) from the receiving mobile communication terminal in step 5e. Thereafter, in the case where the base station 102 receives the SMS message reception confirmation signal from the receiving mobile communication terminal in step 5e, the base station 102 transmits a response signal (i.e., a third acknowledgement signal) for the SMS message reception confirmation signal to the transmitting mobile communication terminal 100 in step 5f.

Figure 6:
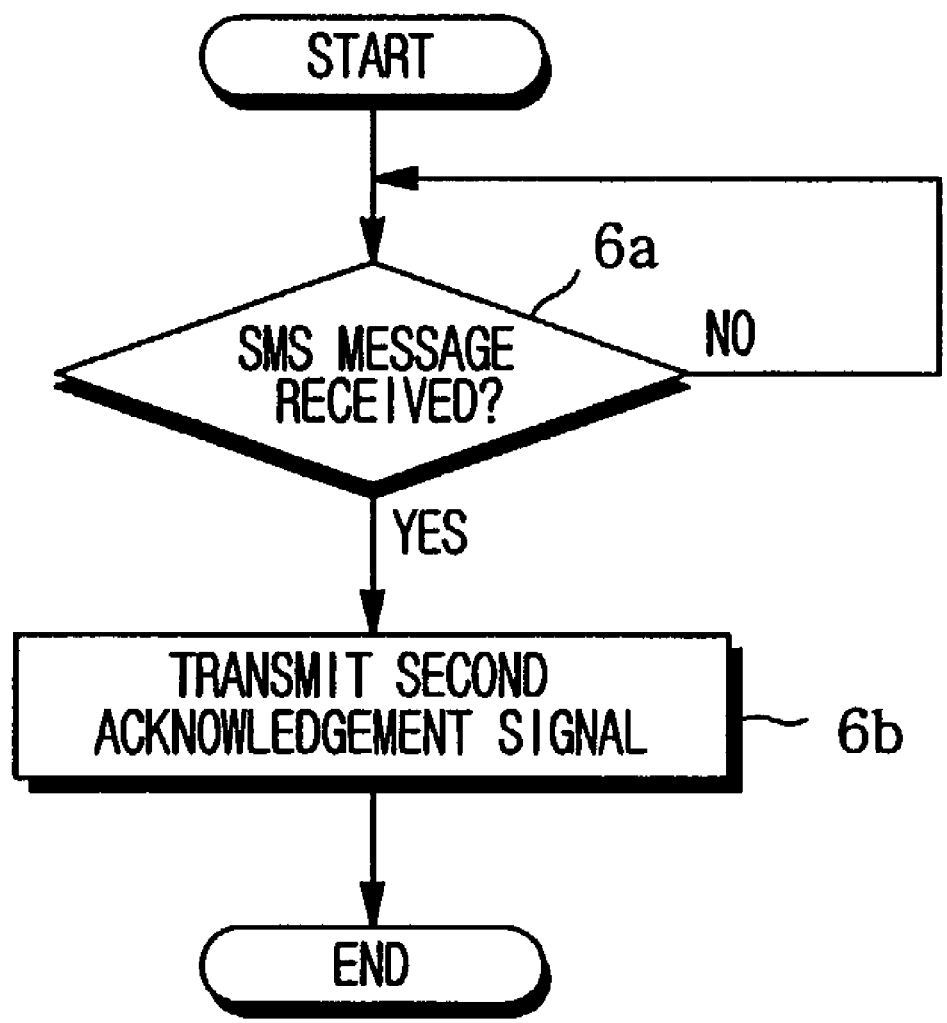
FIG. 6 is a flow chart illustrating an example of operations for a receiving mobile communication terminal to confirm the reception of a SMS message in accordance with an embodiment of the present invention.

FIG. 6 is a flow chart illustrating an example of steps for a receiving mobile communication terminal to confirm the reception of a SMS message in accordance with an embodiment of the present invention.

In step 6a, a determination is made as to whether the receiving mobile communication terminal received a SMS message transmitted from the base station. If the receiving mobile communication terminal received the SMS message from the base station 102 in step 6a, then the receiving mobile communication terminal generates a reception confirmation signal (i.e., a first acknowledgement signal) and transmits the reception confirmation signal to the base station 102 in step 6b.

An example of a method for confirming the reception of a SMS message by a mobile communication terminal will now be described in more detail with reference to FIGS. 4, 5 and 6 and their description set forth above.

Firstly, a transmitting transmission mobile communication terminal 100 transmits a SMS message to a base station, and then the base station 102 transmits a SMS reception acknowledgement signal to the transmitting mobile communication terminal 100.

Secondly, the transmitting transmission mobile communication terminal 100 receives the SMS reception acknowledgement signal from the base station, analyzes the SMS reception acknowledgement signal t, and the SMS message received at the base station 102 from the transmitting mobile communication terminal 100 is transmitted to the receiving mobile communication terminal.

Thirdly, after the receiving mobile communication terminal receives the SMS message from the base station, the receiving mobile communication terminal transmits a SMS reception confirmation signal to the base station.

Fourthly, the base station 102 receives an acknowledgement signal indicating that SMS message was received by the receiving mobile communication terminal, and transmits the acknowledgement signal to the transmitting mobile communication terminal 100.

Finally, a determination is made as to whether the acknowledgement signal was received by the transmitting mobile communication terminal 100. If the acknowledgement signal was not received at the transmitting mobile communication terminal 100, then the transmitting mobile communication terminal 100 provides a service failure indication. Otherwise, if the acknowledgement signal is received at the transmitting mobile communication terminal 100, the transmitting mobile communication terminal 100 provides a powered-off state indication for the receiving mobile communication terminal or SMS message reception indication based on information contained in the received signal.

An embodiment of the present invention will now be described in more detail.

The acknowledgement signal for confirming the SMS message reception is classified as first, second and third acknowledgement signals.

The first acknowledgement signal is a SMS reception confirmation signal generated by a base station 102 when a transmitting mobile communication terminal 100 transmits a SMS message to the base station.

The second acknowledgement signal is a SMS reception confirmation signal generated by a receiving mobile communication terminal receiving the SMS message from the base station, after the base station 102 transmits the SMS message originated from the transmitting mobile communication terminal 100 to the receiving mobile communication terminal.

The third acknowledgement signal is a confirmation signal generated by the base station 102 when the second acknowledgement signal is received at the base station. That is, in the case where the SMS message originated from the transmitting mobile communication terminal 100 is received at the receiving mobile communication terminal, the third acknowledgement signal is generated by the base station 102 and transmitted to the transmitting mobile communication terminal 100.

If the transmitting mobile communication terminal 100 detects a SMS message in step 4a (see FIG. 4) and transmits it to the base station 102 in step 4b, the base station 102 receives the SMS message from the transmitting mobile communication terminal 100 in step 5a, generates the first acknowledgement signal for confirming the SMS message reception, and transmits it to the transmitting mobile communication terminal 100 in step 5b. Then, the SMS message is transmitted from the base station 102 to the receiving mobile communication terminal. In this case, as shown in FIG. 6, after the receiving mobile communication terminal receives the SMS message from the base station 102 in step 6a, the receiving mobile communication terminal generates the second acknowledgement signal confirming the SMS message reception, and transmits the second acknowledgement signal to the base station 102 in step 6b. If the base station 102 receives the second acknowledgement signal from the receiving mobile communication terminal in step 5e, the base station 102 generates the third acknowledgement signal and transmits the third acknowledgement signal to the transmitting mobile communication terminal 100 in step 5f. If it is determined in step 4f that the receiving mobile communication terminal is not powered off, the transmitting mobile communication terminal 100 determines in step 4h whether the received signal is the third acknowledgement signal. If it is determined in step 4h that the received signal is the third acknowledgement signal, the transmitting mobile communication terminal 100 provides SMS reception information on its display in step 4i. Otherwise, in the case where other signals other than the signals in steps 4f and 4h are received at the transmitting mobile communication terminal 100, the transmitting mobile communication terminal 100 provides a service failure indication on its display in step 4j.

Also although the receiving mobile communication terminal is powered off, the base station 102 automatically detects this condition and informs the transmitting mobile communication terminal 100 of the condition. However, in the case where a user of the receiving mobile communication terminal removes a battery from his or her terminal, the base station 102 does not recognize this battery-off state such that the service, failure indication is displayed on the transmitting mobile communication terminal 100.

As apparent from the above description, a method for confirming a SMS message reception according to the present invention enables a transmitting mobile communication terminal 100 to send an urgent SMS message and a general SMS message, allows a calling party to recognize whether a called party associated with a receiving mobile communication terminal received the SMS messages. This eliminates the inconvenience for the calling party who does not hear a response from the called party.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for confirming a Short Message Service (SMS) message reception in a first mobile communication terminal adapted to transmit a SMS message to a second mobile communication terminal, comprising the steps of:
    enabling the first mobile communication terminal to send the SMS message to a base station, and enabling the base station to send a first reception acknowledgement signal to the first mobile communication terminal;
    enabling the base station to send the SMS message to the second mobile communication terminal, and enabling the second mobile communication terminal to send a second reception acknowledgement signal to the base station;
    receiving the second reception acknowledgement signal at the base station, and transmitting a response signal to the first mobile communication terminal indicative of whether the SMS message is received at the second mobile communication terminal; and
    controlling the first mobile communication terminal to display (a) an indication of a power off condition if the second mobile communication terminal is powered off, (b) an indication that the second mobile communication terminal has received the SMS message if an acknowledgement message is received; and (c) a service failure indication if no signal is received.

2. A method for confirming a Short Message Service (SMS) message reception in a first mobile communication terminal adapted to transmit a SMS message to a second mobile communication terminal, comprising the steps of:
    detecting an SMS message to be transmitted at the first mobile communication terminal, transmitting the SMS message to a base station, and determining whether the SMS message is received at the base station;
    enabling the first mobile communication terminal to enter a standby mode for a prescribed duration of time in order to receive a confirmation signal from the base station, and receiving information generated from the base station at the first mobile communication terminal, if it is determined that the SMS message is received at the base station;
    determining whether a signal indicating that the second mobile communication terminal is powered off has been received, and if so, displaying a powered-off indication on the first mobile communication terminal signal indicating the powered-off state of a second mobile communication terminal;
    determining whether an acknowledgement signal indicating that the second mobile communication terminal has received the SMS has been received, and if so, displaying an SMS reception confirmation indication on the first mobile communication terminal to indicate the SMS message reception; and
    displaying a service failure state on the first mobile communication terminal in the absence of a signal confirming the SMS message reception information and the signal indicating the powered-off state of the second mobile communication terminal is received at the first mobile communication terminal.

3. A method for confirming a Short Message Service (SMS) message reception in a base station for a SMS message transmitted from a first mobile communication terminal to a second mobile communication terminal, comprising the steps of:

transmitting a SMS reception confirmation signal to the first mobile communication terminal if the base station receives the SMS message from the first mobile communication terminal;

transmitting the SMS message to the second mobile communication terminal;

enabling the base station to determine whether the second mobile communication terminal is powered off, transmitting a signal indicating a powered-off state to the first mobile communication terminal if the second mobile communication terminal is powered off;

enabling the base station to transmit a response signal to the first mobile communication terminal if the base station receives response information indicating that the SMS message is received at the second mobile communication terminal; and displaying on said first mobile communication terminal a status indication of whether (a) said second mobile communication terminal received said SMS message, (b) said second mobile communication terminal is powered off, and (c) service failure information.

4. The method of claim 3, wherein said first enabling step further comprises:

enabling the base station to determine whether the SMS message is received at the second mobile communication terminal if the second mobile communication terminal is not powered off.

5. The method of claim 3, wherein said first mobile communication terminal is in a standby mode for a prescribed duration of time after transmitting said SMS message.

6. A system for confirming a Short Message Service (SMS) message reception between terminals in a mobile communication network, the system comprising:

a first mobile communication terminal, a second mobile communication terminal, and a base station;

said first mobile communication terminal being adapted to send the SMS message to said base station;

said base station being adapted to send a first reception acknowledgement signal to said first mobile communication terminal, and to send the SMS message to said second mobile communication terminal;

said second mobile communication terminal being adapted to send a second reception acknowledgement signal to said base station; and said base station being further adapted to receive said second reception acknowledgement signal, and to transmit a response signal to said first mobile communication terminal indicative of whether the SMS message is received at said second mobile communication terminal; and said first mobile communication terminal being further adapted to display signals indicative of (a) a power off condition of said second mobile communication terminal; (b) receipt of the SMS message at said second mobile communication terminal; and (c) service failure.

7. The system of claim 6, wherein an absence of said response signal is indicative of a power off condition of said second mobile communication terminal.

8. The system of claim 7, wherein said first mobile communication terminal is adapted to provide a power failure indication on its display based on information contained in said response signal.

9. The system of claim 6, wherein said first mobile communication terminal is adapted to display status information for said second mobile communication terminal based on information contained in said response signal.

10. A system for confirming a Short Message Service (SMS) message reception between terminals in a mobile communication network, the system comprising:

a first mobile communication terminal, a second mobile communication terminal, and a base station;

said first mobile communication terminal being adapted to detect an SMS message to be transmitted, transmit the SMS message to said base station, and determine whether the transmitted SMS message is received at said base station;

said first mobile communication terminal being further adapted to enter a standby mode for a prescribed duration of time in order to receive a confirmation signal from the base station, and to receive information generated from the base station, if it is determined that the SMS message is received at the base station; and said first mobile communication terminal being further adapted to display (a) a powered-off state if the information received from the base station is a signal that indicates the powered-off state of said second mobile communication terminal; (b) a SMS reception confirmation signal if the information received from the base station is a signal confirming a SMS message reception, and (c) a service failure state in the absence of a signal confirming the SMS message reception information and the signal that indicates the powered-off state of the second mobile communication terminal is received at the first mobile communication terminal.

11. A system for confirming a Short Message Service (SMS) message reception between terminals in a mobile communication network, the system comprising:

a first mobile communication terminal, a second mobile communication terminal, and a base station;

said base station being adapted to transmit a SMS reception confirmation signal to said first mobile communication terminal if said base station receives the SMS message from said first mobile communication terminal and transmit the SMS message to the second mobile communication terminal; and said base station being further adapted to determine whether said second mobile communication terminal is powered off, transmit a signal to indicate a powered-off state to said first mobile communication terminal if said second mobile communication terminal is powered off, and transmit a response signal to said first mobile communication terminal, wherein said first mobile communication terminal is further adapted to display a status indication (a) that said second mobile communication terminal received said SMS message when said SMS reception confirmation signal is received, (b) that said second mobile communication terminal is powered off when the signal to indicate a powered-off state is received, and (c) that service has failed when neither the SMS reception confirmation signal nor the signal to indicate a powered-off state has been received.

12. The system of claim 11, wherein said base station is further adapted to determine whether the SMS message is received at said second mobile communication terminal if said second mobile communication terminal is not powered off.

13. The system of claim 11, wherein said first mobile communication terminal is further adapted to be in a standby mode for a prescribed duration of time after said SMS message is transmitted.

14. A system for confirming a Short Message Service (SMS) message reception between terminals in a mobile communication network, the system comprising:

a first mobile communication terminal, a second mobile communication terminal, and a base station;

said base station being adapted to determine whether the second mobile communication terminal receives the SMS message transmitted from said base station; and said second mobile communication terminal being adapted to generate a SMS reception confirmation signal and transmit the SMS reception confirmation signal to said base station if said second mobile communication terminal receives the SMS message from said base station, wherein said first mobile communication terminal is adapted to display a status indication indicative of whether said second mobile communication terminal has received the SMS message, entered a power off state, or entered a battery removal state.

* * * * *